United States Patent [19]

Chazot et al.

[11] Patent Number: 5,762,557
[45] Date of Patent: Jun. 9, 1998

[54] DAMPED FLYWHEEL HAVING A RESILIENT MEMBER DISPOSED BETWEEN TWO COAXIAL MASSES

[75] Inventors: Frank Chazot, Andilly; Jacques Feigler, S/Foret, both of France

[73] Assignee: Valeo, Parisj, Cedex, France

[21] Appl. No.: 507,328

[22] PCT Filed: Dec. 22, 1994

[86] PCT No.: PCT/FR94/01513

§ 371 Date: Sep. 27, 1995

§ 102(e) Date: Sep. 27, 1995

[87] PCT Pub. No.: WO95/17618

PCT Pub. Date: Jun. 29, 1995

[30] Foreign Application Priority Data

Dec. 23, 1993 [FR] France .................. 93 15581

[51] Int. Cl.⁶ .................................................. F16D 3/52
[52] U.S. Cl. ........................ 464/62; 192/212; 464/81
[58] Field of Search ..................... 464/66, 62, 68, 464/81; 192/209, 211, 212, 55.7, 214, 214.1; 74/574

[56] References Cited

U.S. PATENT DOCUMENTS

| | | | |
|---|---|---|---|
| 5,030,166 | 7/1991 | Wörner et al. | 464/68 X |
| 5,120,276 | 6/1992 | Maucher et al. | 464/68 X |
| 5,380,248 | 1/1995 | Kraus et al. | 464/66 |
| 5,505,288 | 4/1996 | Tomiyama | 464/66 X |

FOREIGN PATENT DOCUMENTS

| | | |
|---|---|---|
| 815273 | 7/1937 | France . |
| 2518203 | 6/1983 | France . |
| 2553848 | 4/1985 | France . |
| 2553858 | 4/1985 | France . |
| 2556800 | 6/1985 | France . |
| 2571461 | 4/1986 | France . |
| 2637666 | 4/1990 | France . |
| 2246449 | 4/1974 | Germany . |
| 3622630 | 1/1988 | Germany . |
| 3810921 | 11/1988 | Germany . |
| 63-210435 | 9/1988 | Japan . |
| 9427062 | 11/1994 | WIPO ...................... 464/66 |

OTHER PUBLICATIONS

Japanese Patent Abstract vol. 10 No. 490 (M-779) Dec. 1988.

Primary Examiner—Eileen A. Dunn
Attorney, Agent, or Firm—Longacre & White

[57] ABSTRACT

A damped flywheel having two coaxial masses (1, 2) which are mounted for movement with respect to one another against the action of a resilient damping device (3, 130, 230) including at least one resilient member (31 to 33; 133; 231, 232) mounted for articulation on both sides of the coaxial masses. The resilient member acts generally in a radial direction between the coaxial masses in a rest position of the flywheel to occupy a stable rest position. A second coaxial mass is mounted for rotation on the first coaxial mass through bearing members (14, 114) which are arranged at either the outer or inner peripheries of the first mass.

20 Claims, 9 Drawing Sheets

DAMPED FLYWHEEL HAVING A RESILIENT MEMBER DISPOSED BETWEEN TWO COAXIAL MASSES

BACKGROUND OF THE INVENTION

1. Field of the Invention

The present invention relates to a damped flywheel, especially for a motor vehicle, of the kind comprising two coaxial masses which are mounted for movement of one with respect to the other against the action of resilient damping means, which comprise at least one resilient member operatively interposed between the said masses.

Such a damped flywheel, usually referred to as a double damped flywheel, is described for example in the documents FR-A-2 556 800, FR-A-2 571 461, FR-A-2 553 858.

2. Description of the Prior Art

As is well known, in a damped flywheel for a motor vehicle, one of the masses is carried on the crankshaft of the internal combustion engine of the vehicle, for rotation with it, while the other mass is carried, through an interposed friction clutch, on the input shaft of the gearbox, for rotation with the latter. The said flywheel is arranged to absorb the vibrations which occur in the drive train going from the engine to the road wheels.

In this system having the damped flywheel, the resonant frequency occurs below the slow running mode of the internal combustion engine, so that at starting and stopping of the engine, the system passes through the resonant frequency.

In normal running of the vehicle, resonance effects do not exist within the range of operating speeds of the heat engine. However it is necessary to provide various arrangements in order to attenuate the resonance effects at starting and stopping of the engine of the motor vehicle.

Accordingly, in the document FR-A-2 571 461, an arrangement was provided having a torque limiter, which permits unlimited rotation of one mass with respect to the other when passing through the resonant frequency.

This torque limiter has to be designed so as to transmit maximum torque from the engine, and not to allow the said maximum torque to be exceeded. As a result, it is necessary to provide a safety factor, which is such that the calibration of the limiter is not an optimum.

In the document FR-A-2 556 800, it is arranged to short circuit the resilient device of the damped flywheel and to set up a temporary parallel coupling, in which the two masses are coupled together for simultaneous rotation during starting of the vehicle.

This is achieved for example by means of a starter pinion which, at the instant when the internal combustion engine is engaged, engages at the same time in sets of teeth which are arranged correspondingly in each of the masses.

That arrangement is not entirely satisfactory, especially because it makes it necessary to modify the starter of the vehicle. In addition, a phasing problem arises between the sets of teeth of each of the masses.

In the document FR-A-2 553 848, a temporary lock of the centrifugal type is arranged to act between the two masses during starting of the vehicle.

This solution is again not entirely satisfactory, because the centrifugal lock is capable of jamming. In addition, it calls for a large number of components.

Furthermore, in the above mentioned documents, the resilient members typically consist of helical compression springs interposed circumferentially between the two masses.

These springs, under the action of centrifugal force, can come into frictional contact, for example, against a skirt which is part of one of the masses, so that abrasion effects and wear of the spring can occur. In some cases, these springs can even themselves become jammed.

It is customary to arrange for lubrication of these springs, by mounting the latter for example in a cavity, the greater part of which is bounded by one of the masses, and which is filled at least partly with grease. It is also possible to equip the springs with anti-wear elements such as pads or channel-shaped pieces.

In addition, the torsional stiffness of the device is constant, and within a given space its torque transmission capacity is limited.

It is also common to provide a hysteresis friction device between the two masses, with a friction ring which acts differentially in order to damp the resonance effects, but control of this is not easy to achieve.

In addition, all of these arrangements can give rise to a significant friction effect in the slow running mode of the internal combustion engine.

An object of the present invention is to overcome these drawbacks and accordingly to provide, in a simple and inexpensive way, a novel damped flywheel having an increased torque capacity, which is quite insensitive to the starting and stopping of the engine of the vehicle, while being of reduced cost and having a resilient damping device which is provided with at least one resilient, low friction member that requires no lubrication.

SUMMARY OF THE INVENTION

In accordance with the invention, a damped flywheel of the type described above is characterised in that the resilient member of the resilient damping device is mounted by articulation on each of the said masses, in that the said resilient member acts generally radially between the said masses in the rest position of the damped flywheel, in such a way that the said resilient member occupies a generally radial rest position and inclined working positions, and in that the said mass is mounted for rotation on the first mass by interposed bearing means which are arranged at one of the inner and outer peripheries of the first mass.

The invention enables the damped flywheel to transmit higher torques, while having a resilient member in which parasitic friction effects are reduced due to its articulated mounting. Several resilient members are preferably provided, these being spaced apart circumferentially at regular intervals.

It will be appreciated that the position of the bearing means enables the resilient member to be elongated radially, which is favourable to an increase in the relative angular displacement between the two masses, and also to torque transmission.

Examination of the various operating situations in which the heat engine is used enables the advantages conferred by the device which is the subject of the invention to be set forth as follows:

- when the engine is in the slow running mode, with the gearbox in neutral, the low stiffness associated with the low friction of the device leads to optimum absorption of vibrations;
- when the engine is in a driving mode, and regardless of the prevailing running speed and the torque transmitted, the torsional stiffness characteristic that evolves enables the torque to be transmitted, while giving optimal damping of vibrations by virtue of a level of stiffness which, although it is variable, remains sufficiently low, together with reduced friction effects; in the starting and stopping phases of the heat engine, which are characterised by a very low level of transmitted torque, the stiffness characteristic, which is very low and which is variable continuously with displacement, naturally enables the resonance effect to be very greatly attenuated (since the resonant frequency becomes variable with displacement), and this is achieved in the absence of any complementary friction device or locking device.

The stiffness of this resilient damping device is thus variable with its displacement, by virtue mainly of its articulated mounting.

In general terms, the damped flywheel in accordance with the invention is of an inexpensive form and requires no greasing of the springs.

According to another feature, the resilient member is mounted by articulation on the inner periphery of one of the two masses, by articulating means which are generally arranged on the same common pitch circle as the holes which are provided on the first mass at its inner periphery, for passage therethrough of a fastening member, such as screws, by which the first mass is fastened to its driving shaft, which is the crankshaft of the engine of the vehicle in application to a motor vehicle. This also favours an increase in the length of the resilient member. The second mass may thus be mounted for rotation on the first mass using bearing means of reduced size, which are interposed on a hub or central sleeve at the inner periphery of the first mass. These bearing means are then arranged radially inwardly of access holes formed in the second mass to allow passage through them of tools for securing the fastening members on the driving shaft associated with the first mass.

In a modification, the resilient member may be mounted by articulation at the outer periphery of the second mass, radially inwardly of bearing means acting at the outer periphery of the two masses. The resilient member is then mounted by articulation on a pivot which is fixed to the first mass, and which is located on generally the same pitch circle as the access holes through which the fastening members can be passed so as to secure the first mass to its driving shaft.

In one embodiment, the resilient member may be mounted on both masses directly by articulation. In a modification, the resilient member may be mounted by articulation on both masses through draw pieces, which are preferably arranged in head to toe relationship.

The articulated mounting can be obtained by means of pivot pins. The pivot pins associated with the second mass, which constitutes the reaction plate of a clutch, may be fitted between two consecutive holes which are arranged for the passage therethrough of a tool for tightening the fastening screws that secure the first mass to the crankshaft of the engine.

In a modification, the said pivot pins of the second mass may be located in the said holes.

The second mass may be mounted for rotation on the first mass through bearing means such as a rolling bearing, which is interposed either between the inner periphery of the second mass and the outer periphery of a hub or sleeve of the first mass, or between the outer periphery of the second mass and a component carried by the outer periphery of the first mass.

In one embodiment, one of the masses has at its outer periphery an annular support element, which may optionally be of divided form, for carrying an articulated means such as a pivot pin for the mounting of the resilient member by articulation. In this way, the pivot pin is well supported, and at the same time the resilient member is located axially by the said support element. For example, the support element may be formed at the outer periphery of the first mass, with the second mass being mounted for rotation at its inner periphery on bearing means, of reduced size, which are carried by a central sleeve fixed to the first mass. In this way a first mass is obtained having a high inertia, while also having a resilient member which is long in the radial direction.

According to one feature, a window can then be provided in the first mass for ventilating the resilient member, the said window being formed in a recess of the first mass which serves for accommodating the resilient member and for defining the support element. The resilient member is thus ventilated and may be brought very close to the second mass, which enables the axial size of the damped flywheel to be reduced. The number of windows and the number of resilient members does of course depend on the applications.

The following description illustrates the invention with reference to the attached drawings, in which:

DETAILED DESCRIPTION OF THE PREFERRED EMBODIMENT

Figure 1:
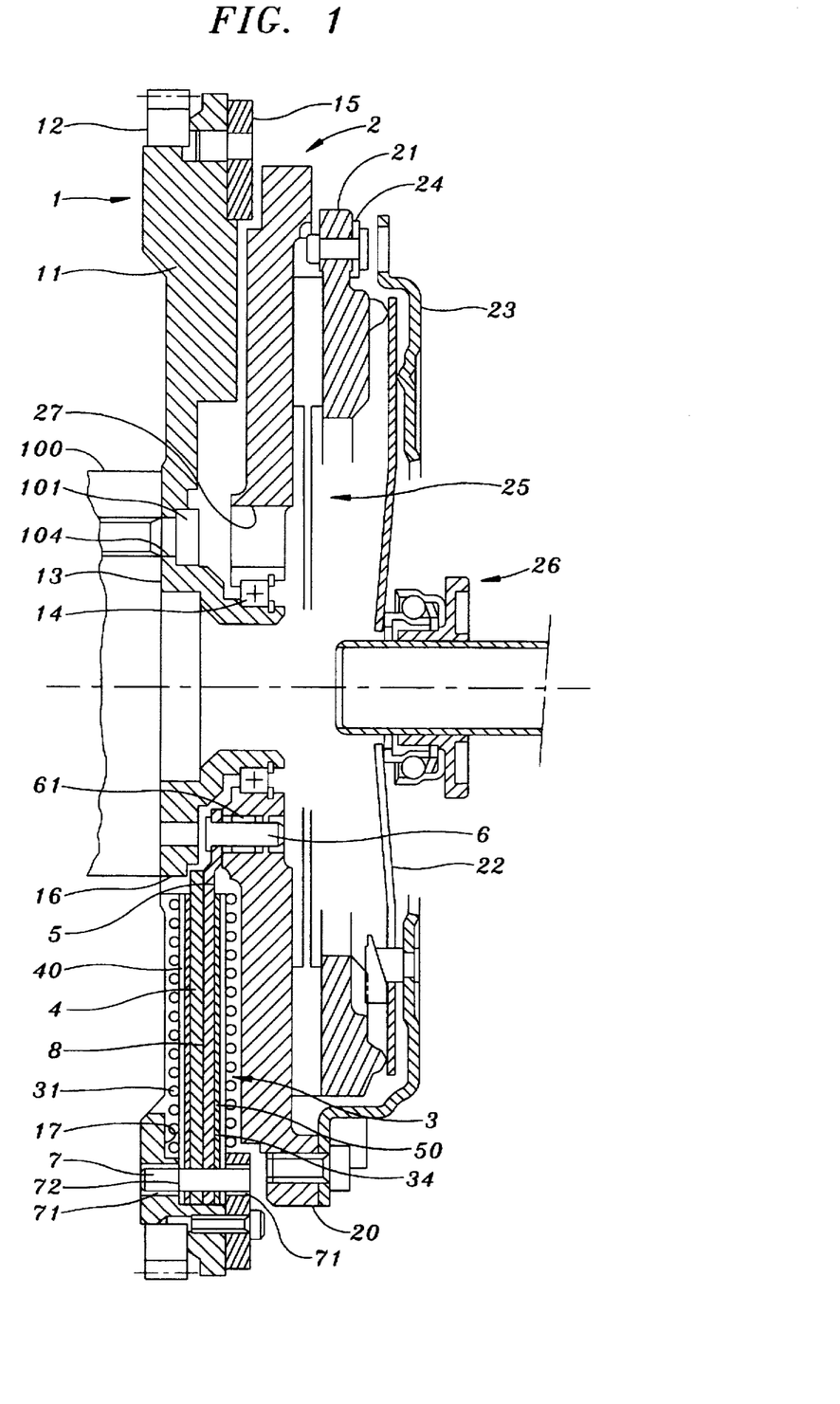
FIG. 1 is a view in axial cross section of a damped flywheel in accordance with the invention.

FIG. 1 shows a damped flywheel for a motor vehicle comprising two coaxial masses 1, 2 which are mounted for movement of one with respect to the other against the action of a resilient damping means 3, which comprises at least one resilient member 31, 32, 33 working between the two masses 1 and 2. The second mass 2 is mounted for rotation on the first mass 1, through bearing means 14 of reduced size which act at the inner periphery of the two masses 1, 2.

In this example, the first mass 1 consists generally of a plate 11, which carries at its outer periphery a starter crown 12 which is arranged to be driven by the starter of the motor vehicle.

In this example the mass 1 is driven by the internal combustion engine of the motor vehicle, being fixed on to the crankshaft 100 of the said engine by means of studs 101, and the plate 11 has a central, axially oriented, sleeve 13. This sleeve 13, which in this example is integral with the plate 11, carries a bearing 14 which is interposed radially between the outer periphery of the sleeve 13 and the inner periphery of the mass 2. The second mass 2 is thus mounted for rotation at the inner periphery of the first mass 1, through the bearing means 14.

In the present case, the bearing 14 consists of a ball bearing which is located axially on the mass 2 and on the sleeve 13, by shoulders which are formed on the said components 13, 2, together with circlips which are engaged in grooves formed in the said components 13, 2.

The mass 2 has, from place to place, holes 27 for passage through them of a tool for tightening the studs 101 so as to fasten the first mass 1 to the crankshaft 100.

These holes 27 are accordingly in axial alignment with the holes 104 which are formed in the plate 11 (at the inner periphery of the latter) for accommodating the studs 101 that fasten it to the crankshaft 100. The bearing means 14 are then reduced in size, because they lie on a pitch circle having a diameter smaller than that of the passages 27 and of the said holes 104 in the plate 11. This enables the size of the resilient members 31, 32, 33 to be reduced, in a manner to be described later herein.

The second mass 2, which in this example is a casting, constitutes the reaction plate of a friction clutch which incudes a pressure plate 21, a diaphragm 22, a cover plate 23 and a friction disc 25.

In this example the cover plate 23 is in the form of a dished plate having a central hole through its base, and it is secured through its radial flange, by means of screws, on to the reaction plate 2. The diaphragm 22 is mounted for tilting movement on the cover plate by means of spigot members, one of which can be seen in the lower part of FIG. 1.

The diaphragm 22 bears on the pressure plate 21, and urges the latter towards the reaction plate 2 so as to grip friction liners, which are carried by the disc 25 at its outer periphery, between the said pressure plate 21 and reaction plate 2.

The disc 25 is coupled to a central hub (not shown) which is mounted in rotation on the input shaft of the gearbox.

The pressure plate 21 is coupled in rotation to the cover plate 23, being mounted, for axial movement with respect to the latter in a manner known per se, by means of tangential tongues 24.

The clutch is normally engaged, and, as has been mentioned above, the friction liners of the disc 25 are gripped between the plates 2, 21.

In order to disengage the clutch, it is necessary in the present case to exert a thrust by means of a clutch release bearing 26 on the ends of the fingers of the diaphragm 22, so as to cause the latter to pivot in such a way as to remove the load which is exerted by the diaphragm 22 on the pressure plate 21, which is then transferred towards the base of the cover plate 23 by means of the tangential tongues 24.

Thus the first mass is mounted in rotation on a driving shaft, the crankshaft of the internal combustion engine, while the second mass 2 is coupled in rotation to a driven shaft, which is the input shaft of the gearbox, by means of a friction clutch 2, 21 to 25.

In this example, in accordance with one feature of the invention, the resilient member 31, 32, 33 of the resilient damping device 3 is mounted by articulation on both of the said masses 1, 2. The said resilient member works in a generally radial direction between the said masses in the rest position of the damped flywheel, in such a way that the said resilient member occupies a generally radial rest position and inclined working positions.

Figure 4:
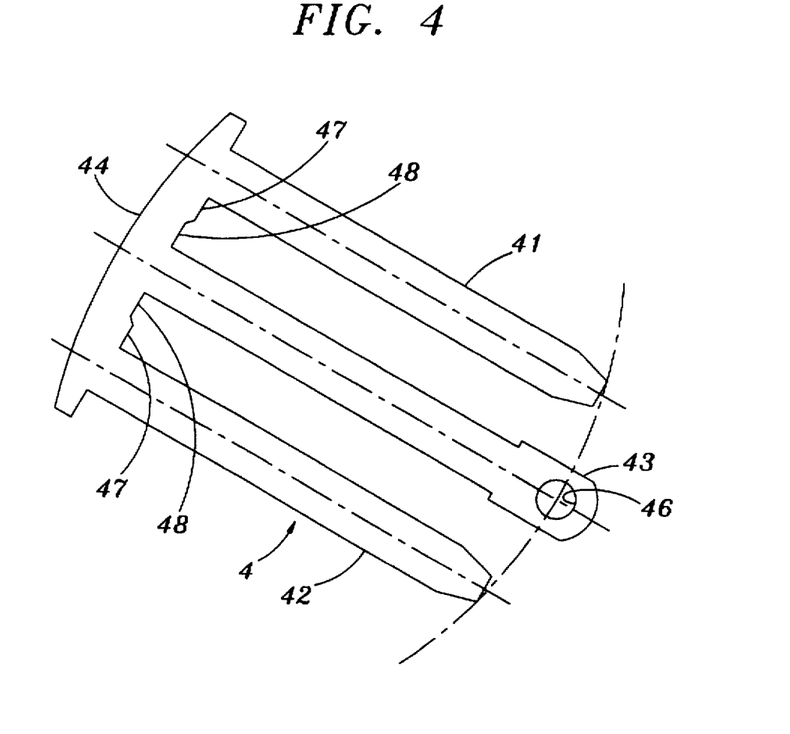
FIGS. 4 and 5 are views showing the articulating draw pieces.
Figure 5:
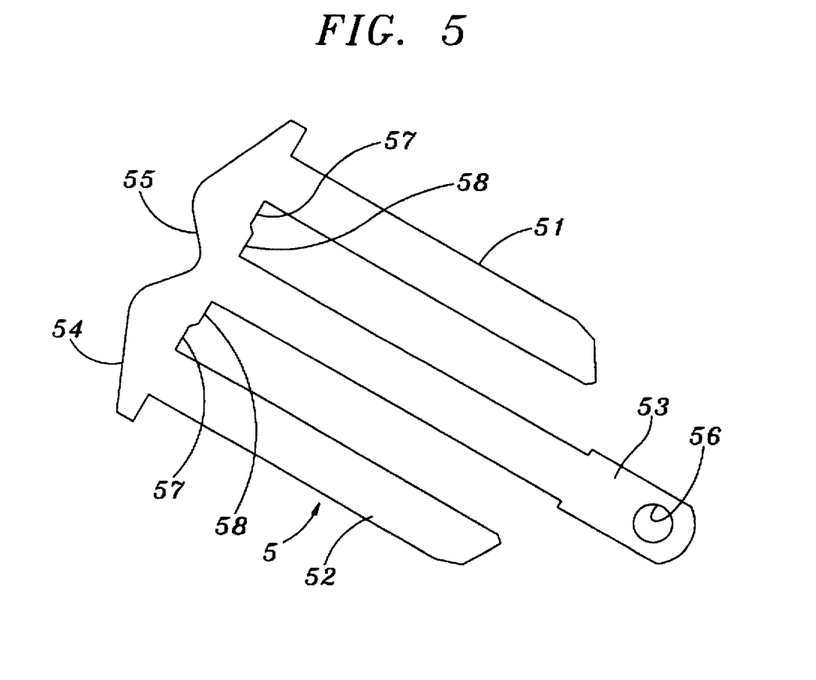

In the present case, the said resilient member is mounted by articulation on the two masses 1, 2 by means of draw pieces 4, 5 which can be seen best in FIGS. 4 and 5. The draw pieces are of matching forms one to the other, and in the present case they are of metal.

More precisely, in FIGS. 1 to 5 three resilient members 31, 32, 33 in the form of identical coil springs are provided with draw pieces 4, 5 for increasing the torque which is transmitted.

Figures 2, 3:
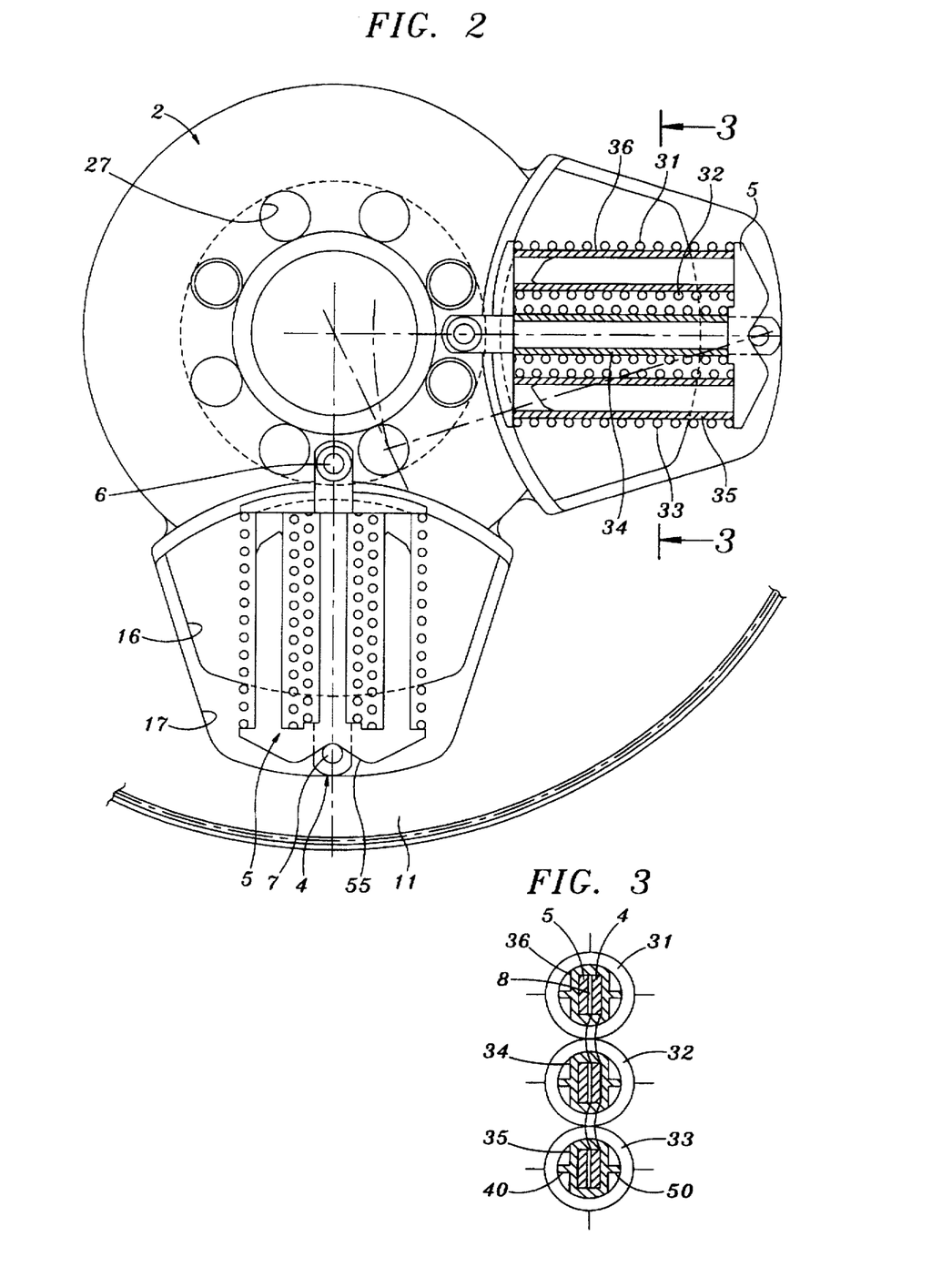
FIG. 2 is a partial view taken in the direction of the arrow 2 in FIG. 1.
FIG. 3 is a view in cross section taken on the line 3—3 in FIG. 2.

There are four sets of draw pieces 4, 5 and springs 31, 32, 33 which are spaced apart circumferentially at regular intervals. Two of these are shown in FIG. 2.

In the present example, the springs 31, 32, 33 are adjacent to the second mass, and extend parallel to the latter.

To this end, in each set 4, 5, 31, 32, 33 mentioned above, the plate 11 is formed with windows 16 and recesses 17. The recesses 17 are formed mainly at the outer periphery of the plate 11 of the mass 1, facing towards the mass 2, while the windows 16 extend from the inner periphery of the plate 11, radially outwardly of the studs 101.

The recesses 17 and the windows 16 enable the coil springs 31 to 33 to be fitted. More precisely, the windows 16 enable the resilient members 31, 32, 33 to be properly ventilated, while, with the recesses 17, reducing axial size. The resilient members 31, 32, 33 are thus able to come close to the second mass, lying parallel to the latter.

In this example the draw pieces 4 and 5 are in the form of tridents. They are made by press forming from metal sheet.

It is of course possible to provide other arrangements, according to the application. The draw pieces may be formed with one tooth, two teeth, five teeth etc. In that case, one spring, two springs, five springs etc. are provided. There is preferably an odd number of teeth and springs.

In this example the draw piece 4 has a base portion 44 with a curved back face, together with three teeth 41, 42, 43 which are joined integrally to the base portion 44. The draw piece 4 has a symmetrical shape, as has the draw piece 5.

The teeth 41 and 42 are of matching forms one to the other, and each has a chamfered free end. These teeth 41 and 42 flank, symmetrically, the central tooth 43 which is longer, and which has a widened free end in which is formed a hole 46 for fitting of a pivot pin 7, which is described below and which constitutes a first articulating means. Between the teeth 42 and 43, the base portion 44 is stepped so as to define shoulders 47, 48 which are offset axially with respect to each other.

Between the teeth 41 and 43, the profile of the base portion 44 is symmetrical with respect to its profile between the teeth 43 and 42, so that the said base portion is stepped at that level.

The draw piece 5, which is of similar form to the draw piece 4, has a base portion 54 with a curved back face, but this back face is notched or recessed centrally at 55, for accommodating the pivot pin 6 which constitutes a second articulating means to be described below. Three teeth 51 to 53 are joined integrally to the base portion 54.

The teeth 51 and 52 are of matching forms one to the other, and have an inclined free end. The teeth 51 and 52 flank the central tooth 53 symmetrically.

This central tooth is longer than the teeth 51 and 52, and has an enlarged free end portion which is formed with a hole 56 for fitting on to a pivot pin 6.

The base portion 54 of the draw piece 5 is stepped between the teeth 52, 53 and between the teeth 53, 51, this being a symmetrical arrangement so as to define shoulders 57, 58 which are offset axially with respect to each other.

It will be noted that the shoulder 48 adjacent to the central tooth 43 corresponds to a recess, while in the draw piece 5, the recess corresponds to the shoulder 57 that faces away from the central tooth 53. In this way the best use is made of the space available between the two base portions 44, 54 of the draw pieces, with good retention of the springs.

According to one feature, the draw pieces 4 and 5 are mounted in head to toe relationship. In this example the teeth 41, 42, 43, and 51, 52, 53 are arranged to slide in contact with each other.

In order to reduce friction effects, it is arranged that a coating 8, of a material having a low coefficient of friction such as "Teflon", is interposed between the two draw pieces 4 and 5 so as to facilitate the relative movement between the two draw pieces 4, 5.

The draw pieces are mounted within tubular guides 34, 35, 36. Thus the outer faces of the draw pieces 4 and 5 are arranged to rub against the inner faces of the guides 34, 35, 36, which in the present case are tubular with a rectangular internal cross section, like the teeth of the draw pieces 4 and 5.

The guides 34, 35, 36 are preferably made of a synthetic material having a low coefficient of friction, and they are dimensioned as a function of the teeth of the draw pieces 4 and 5.

Each guide 34, 35, 36 has two diametrically opposed guide ribs 40, 50 which project from the longitudinal edges of the guides.

As will have been understood and as is shown in the drawings, the coil springs 31, 32, 33 are mounted respectively on the guides 36, 34, 35, being fitted over the latter, and in particular over the ribs 40, 50, with the side edges of the guides 34, 35, 36 being rounded so as to match the inner periphery of the said springs (FIG. 3).

It will be appreciated that, because of the shoulders 47, 48, 57, 58, interference is avoided between two consecutive coil springs 31, 32, 33. The chances of abrasion effects arising are thus minimised.

In this connection, the central spring 32 bears at one of its ends on the shoulders 58 of the draw piece 5, and at its other end on the recess shoulders 48 of the draw piece 4, while the spring 31 is in engagement at one of its ends on the shoulders 47 of the draw piece 4, and at its other end on the shoulders 57 of the draw piece 5. The same is true for the spring 33.

Thus, because of the axial offsets of the shoulders 57, 58 and 47, 48, any interference between the ends of the springs 31, 32, 33 is prevented.

These springs 312, 32, 33 work between the base portions 54, 44 which constitute a support means for the said springs (the radial ends of the latter).

It will be noted that the base portions 44, 54 are profiled so as to have a curved form between the teeth, in order to increase the engagement surface of the springs 31 to 33 (FIG. 3).

Because of the guide tubes 34, 35, 36 and the associated teeth of the draw pieces 4, 5, any deformation of the springs 31, 32 under the action of centrifugal force is prevented, as is jamming between them.

In this example, the draw piece 5 is articulated at its inner periphery, through its central tooth 53 and its hole 56, on a pivot pin 6 (the second articulating means), which is carried by and fixed to the inner periphery of the second mass 2.

The pivot pin 6, which is force-fitted into the mass 2, has a shouldered end for retention of the free end portion 53 between the said head and the surface of the plate 2 which faces towards the plate 11.

The shank of the pin 6 is fixed into a needle bearing 61, which is mounted in a hole formed in the plate 2 for this purpose. This hole is arranged between two consecutive access holes 27 (FIG. 2). Its size is smaller than that of the said hole 27, and it is located on the same pitch circle as the latter.

In practice, the pivot pin 6 is force-fitted into the through hole 56 in the tooth 53, in such a way that the draw piece 5 is articulated at its inner periphery on the mass 2. The draw piece 4 is force-fitted, through its hole 46, on a pivot pin 7, the ends of which are mounted by articulation, in bearing bushes 71 which are mounted, respectively, in a through hole in the plate 11 and in a through hole in a respective closure element 15, these being carried by the plate 11 at the outer periphery of the latter.

These elements 15 increase the inertia of the mass 1 and are adjacent to the mass 2. They are attached by screwed fastening on to the plate 11. In this example, the elements 15 are part of a common closure ring which stiffens the first mass 1. The position of the pivot pins 7 also contributes to the increase in inertia.

Thus, the plate 11 has at its outer periphery cavities which are delimited by the plate 11 and the elements 15, for fitting of the sets of components 4, 5, 31 to 36. These cavities are in circumferential alternation with the unrecessed portions of the plate 11.

The plate 11, which is recessed at its outer periphery, defines, with the closure member or members 15, support elements for the pivot pins 7.

In accordance with the features of the invention, the resilient damping means is accordingly mounted by articulation at its outer periphery on the plate 11 through articulating means 7, referred to as the first articulating means and carried by support elements 11, 15 formed at the outer periphery of the first mass 1. In other words, the first mass 1 has at its outer periphery an annular support element which is divided circumferentially into alternate recesses 17 and unrecessed portions of the plate 11. The mass 1 therefore has a high inertia. The support element also retains the damping device 3 against axial movement.

It will be noted that the pivot pin 7 is retained against axial movement by means of a circlip 72, which is located axially by the plate 11 and the guide tube 34.

It will be noted that the curved profile of the base portion 44 of the draw piece 4 enables the latter to hug the profile of the inner edge of the window 16, which is wider at its inner periphery than at its outer periphery (FIG. 2), so as to retain the greatest possible amount of material, and that the profile of the base portion 54 of the draw piece 5 enables the pivot pin 7 to be accommodated because of the central notch 55 of the draw piece, which enables the length of the springs 31 to 33 to be increased.

Thus, in the rest position of the damped flywheel, the springs 31 to 33 extend parallel to each other, with the central spring 33 being orientated radially in the rest position of the damped flywheel.

Figure 6:
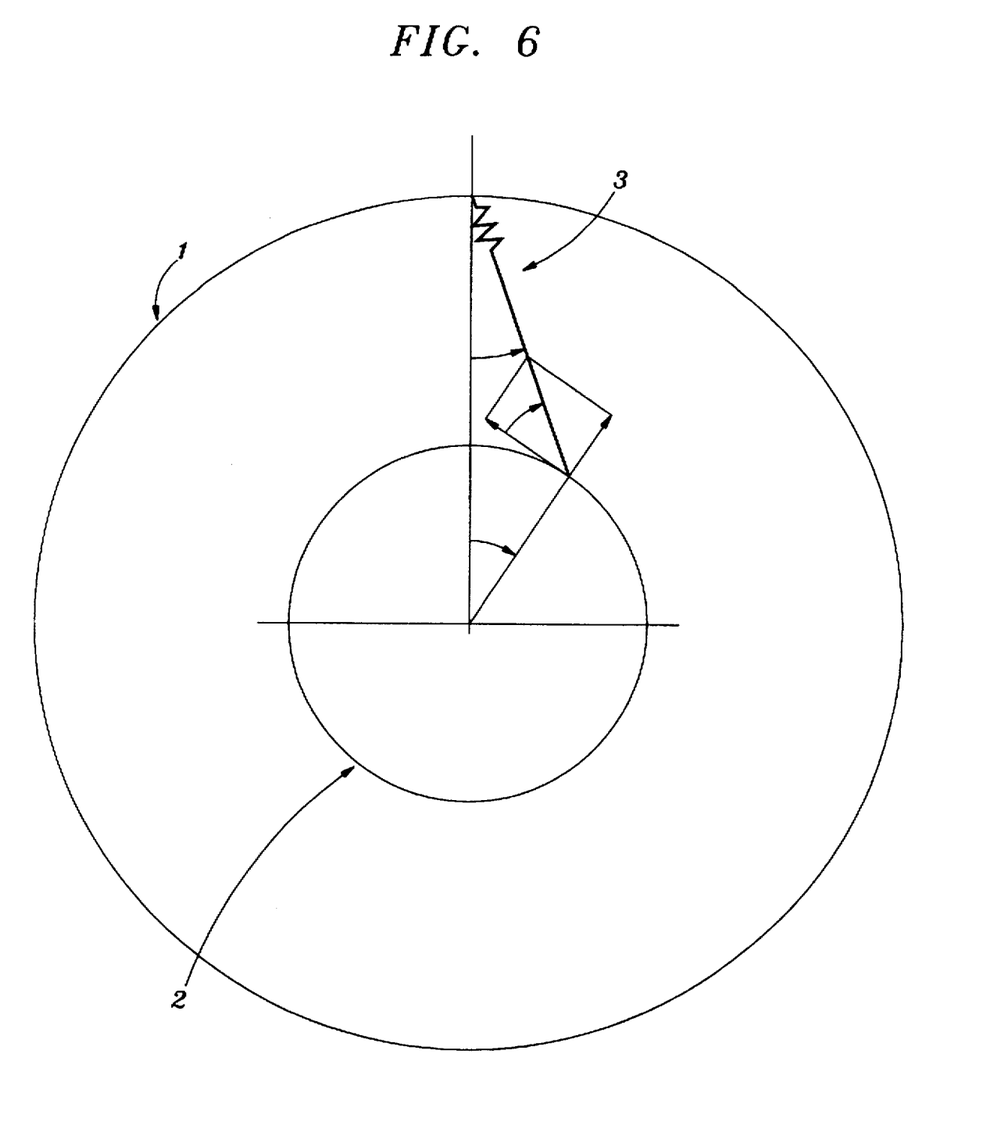
FIG. 6 is a diagrammatic view of the resilient damping device which works between the two masses.

This rest position, which in the present case is purely radial, is stable. In this connection, and referring for example to FIG. 6, it can be seen that once the mass 2, for example, is displaced with respect to the mass 1, the springs 31, 32, 33 tend to exert a return action towards the rest position. These springs work in compression in this case.

The line of action is thus radial in the present case.

By virtue of the arrangement provided by the invention, a resilient damping device 3 is obtained which is of variable stiffness. In this connection, because of the articulated mounting, the forces exerted by the device 3 are resolved into an active tangential force and an inactive radial force, which is directed towards the axis of the assembly (FIG. 6) and which in this example is absorbed by the second mass.

Thus, in the slow running mode of the engine, the stiffness of the device 3 is low, and it then increases continuously in higher operating modes (at higher torques) of the engine, with the angular displacement between the two masses 1 and 2 increasing.

Figure 7:
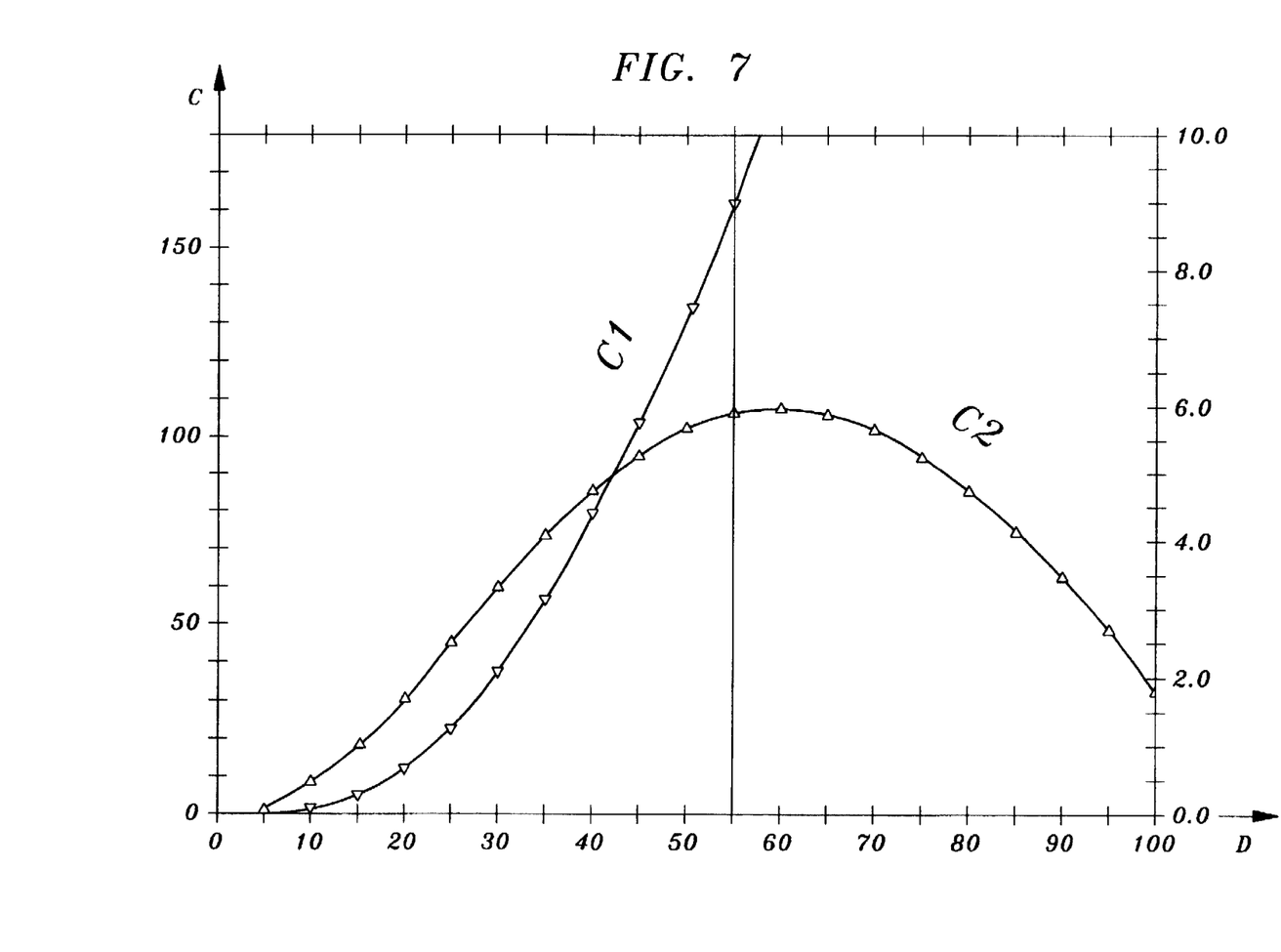
FIG. 7 is a diagram showing the characteristic curve of the damped flywheel in accordance with the invention.

The invention enables high angular displacements to be obtained between the two masses (FIGS. 7), which are comparable to those which are obtained with the better devices having circumferentially acting springs, with a high axial displacement for absorbing vibrations during the slow running mode of the engine.

Thus, during starting and stopping of the engine of the motor vehicle, it passes through the resonant frequency of the engine, and very good damping is obtained because, during this phase, the angular displacement between the two masses increases rapidly, as does the stiffness of the resilient damping device 3 in accordance with the invention.

Examination of the various operating situations in which the heat engine is used enables the advantages conferred by the device which is the subject of the invention to be set forth as follows:

when the engine is in the slow running mode, with the gearbox in neutral, the low stiffness associated with the low friction of the device leads to optimum absorption of vibrations;

when the engine is in a driving mode, and regardless of the prevailing running mode and the torque transmitted, the torsional stiffness characteristic that evolves enables the torque to be transmitted, while ensuring optimum damping of vibrations by virtue of a level of stiffness which, although it is variable, remains sufficiently low, together with reduced friction effects;

in the starting and stopping phases of the heat engine, which are characterised by a very low level of transmitted torque, the stiffness characteristic, which is very low and which is continuously variable with displacement, naturally enables the resonance effect to be very greatly attenuated (since the resonant frequency becomes variable with displacement), and this is achieved in the absence of any complementary friction device or locking device.

In this way, a high displacement damped flywheel is obtained without recourse being had to any lubrication of the resilient members of the resilient damping device 3. Thus, in FIG. 7, the abscissa represents the angular displacement D, in degrees, between the two masses, while the coordinate represents, respectively, the transmitted torque C in Nm, and the stiffness in Nm of the resilient device in accordance with the invention. The curve C1 is the characteristic curve of the transmitted torque, while the curve C2 is the curve of torsional stiffness of the resilient device. It will be noted that the stiffness may be zero in the region of the stable rest position.

It will be noted that frictional effects at the level of the springs 31, 32, 33 are minimised, due to the presence of the guides 34, 35, 36, and that the springs 31, 32, 33 are hardly deformed, due to the presence of these ribbed guides 34 to 36.

In addition, the draw pieces 4, 5 are able to slide easily in contact with each other, due to the guides 34 to 36 and the low friction coating 8.

It will be noted that the concave inner edge of the window 16 (FIG. 2) is in the form of an arc of a circle, so as to permit displacement of the resilient damping device, which pivots (inclines) during the relative angular displacement between the two masses 1 and 2. The convex outer edge of the window 16 is also in the form of an arc of a circle. This ventilating window 16 is formed in the recess 17 (FIG. 2), and slightly reduces the inertia of the first mass.

It is of course possible to reverse the structures. Thus (FIG. 8), the second mass 2 can be mounted for rotation at the outer periphery of the first mass 1 through bearing means 114, which in this example consist of a ball bearing 114 fitted at the outer periphery of the masses 2, 1. The resilient members in accordance with the invention can thus have a substantial length, while the first mass 1 has a high inertia.

Figure 8:
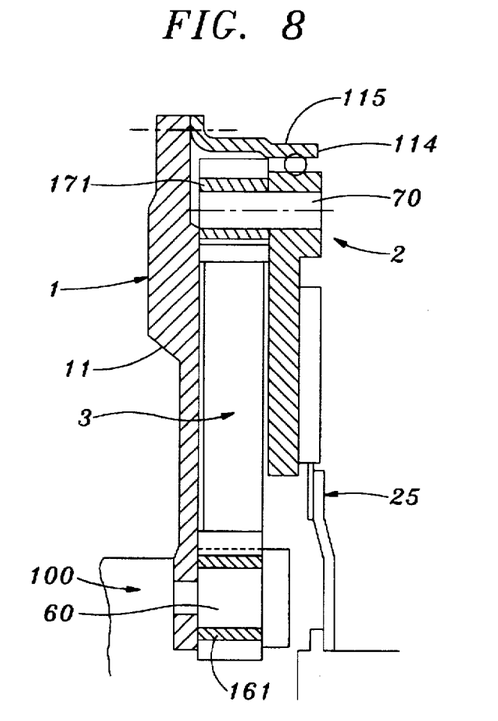
FIG. 8 is a partial view in axial cross section, for another embodiment.

To this end, the said bearing comprises a member 115 of sheet metal which is secured, for example by screwed fastening, to the outer periphery of the plate 11. This member 115 constitutes the outer ring of the bearing, the inner ring of which is defined by the outer periphery of the mass 2. In this case, the resilient damping device 3 is mounted by articulation at its outer periphery on the mass 2, and by articulation at its inner periphery on the mass 1, by contrast with the embodiment in FIG. 1 in which the said device is mounted by articulation at its inner periphery on the mass 2 and at its outer periphery on the mass 1.

In the present embodiment, the pivot axes 60 and 70 are surrounded by articulating sleeves 161, 171, in which the central teeth of the draw pieces 4, 5 are engaged by their through holes. It is of course possible to provide needle bearings in place of the sleeves 161, 175.

More precisely, the pivot pin 60 is force-fitted into the plate 11 at the inner periphery of the latter, being shouldered for retention of the sleeve 161, while the pivot pin 70 is force-fitted at the outer periphery of the mass 2, radially outwardly of the friction disc 25. In this example, the pivot pins 60 are in circumferential alternation with the through holes, for accommodating the fastening screws (not shown), which are formed in the plate 11.

The said pivot pins 60 are fitted on the same pitch circle as the said through holes for accommodating the fastening screws.

The mass 2 can of course include, at its outer periphery, an annular support element which may be of divided form, for fitting of the pivot pins 70. Thus, one of the masses has, in every case, an annular support element, which may be of divided form, at its outer periphery for the fitting of the appropriate pivot pins and for good support of the latter.

Figure 9:
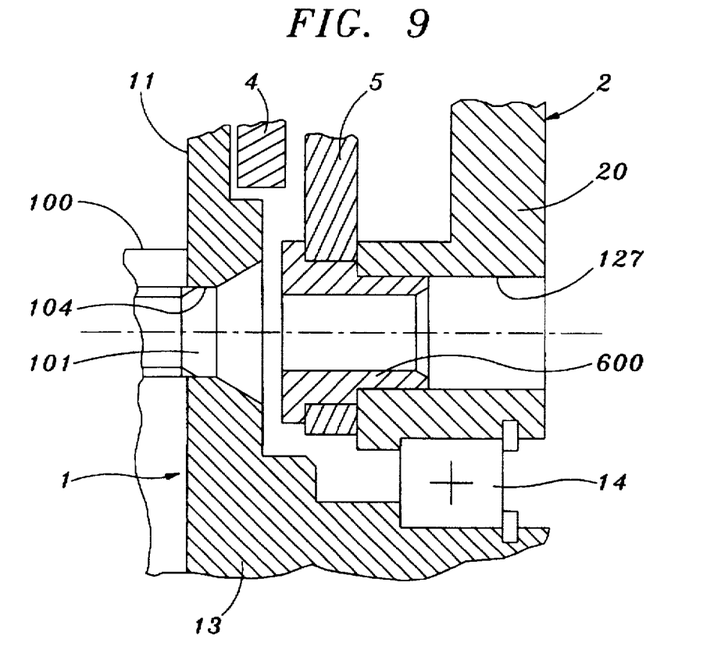
FIG. 9 is a partial view in axial cross section showing the centre of the double flywheel in a further embodiment.

In FIG. 9, the pivot pin 600 on which the draw piece 5 is mounted may be hollow and may be fixed in a through hole 127 in the mass 2, to give access for a tool for tightening the fastening studs 101. The tool passes through the pivot pin 600, which is force-fitted in the hole 127. This hole 1 27 is therefore in alignment with the hole 104 which is arranged at the inner periphery of the plate 11, to enable the appropriate stud 101 to pass through it. Thus, the pivot pins 600 are located on the same pitch circle as the holes 104 in the first mass 1 which are arranged for accommodating the fastening members 101, which in this example are the studs 101.

The presence of the draw piece is of course not obligatory.

Figure 10:
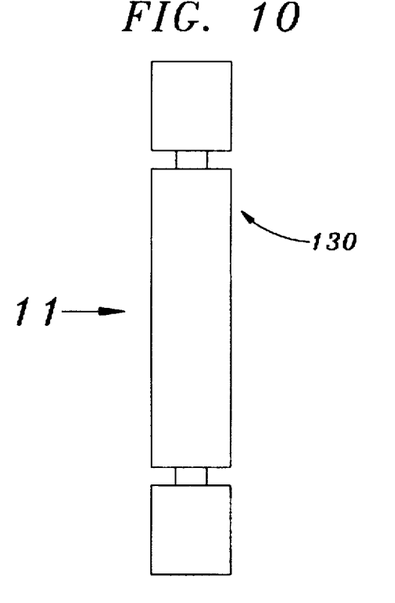
FIG. 10 is a partial view showing another example of a resilient member.
Figure 11:
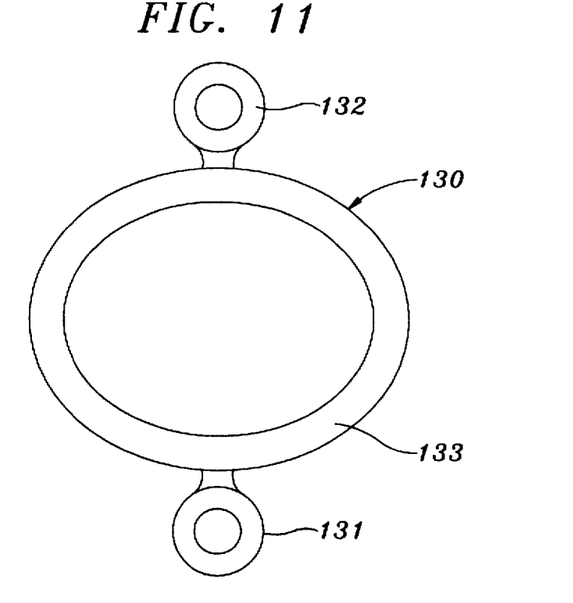
FIG. 11 is a view seen in the direction of the arrow 11 in FIG. 10.

Thus, in FIGS. 10 and 11, the resilient damping device 130 can consist of a metallic ring 133 having diametrically opposed radial arms, which carry two portions 131, 132 for articulated mounting on the pivot pins 6 and 7, respectively, of FIG. 1.

The axes of the portions 131, 132 are then in radial alignment with each other.

Figure 12:
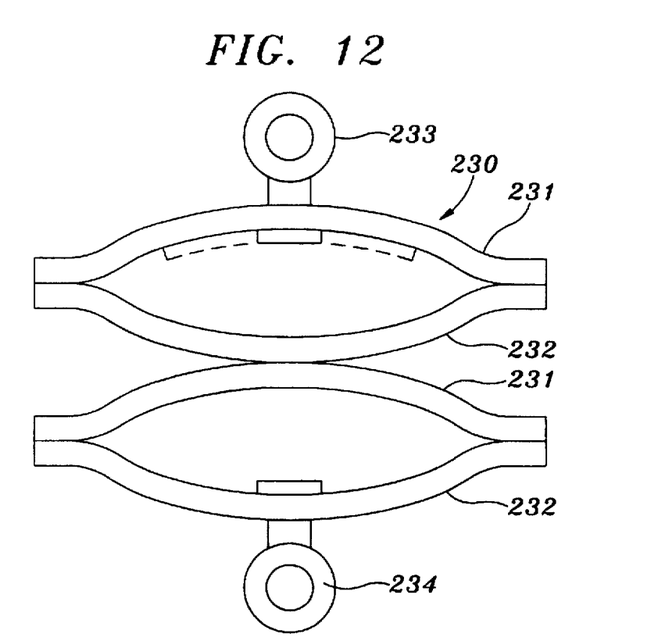
FIGS. 12, 13 and 14 are views similar to FIG. 11, showing further embodiments by way of example.

In FIG. 12, it can be seen that the resilient damping device 230 can consist of a stack of curved leaf springs 231, 232, which carry at each of their ends sleeve portions 233, 234 for mounting of the device 230 by articulation on the axes 7 and 6, respectively, of FIG. 1.

It can be seen from FIG. 12 that the resilient damping device has two leaf springs 231 and two leaf springs 232 which are mounted in head to toe relationship, being in contact with each other at their circumferential ends.

The central leaf springs 231 and 232 are curved, and are in contact with each other, with the endmost leaf springs 231 and 232 carrying the articulating sleeve portions 233 and 234.

The leaf springs 232, 231 are of course fixed together, for example by welding.

Figure 13:
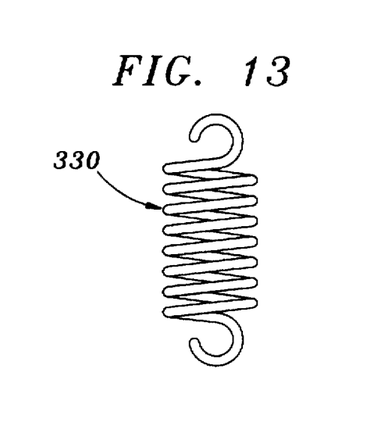

In FIG. 13, the resilient damping device 330 consists of a coil spring, with a hook at each of its ends for fitting on to the pivot pins 6 and 7, or to any other similar element, for example projections in the form of pins projecting from the masses.

Thus, in FIGS. 10 to 13, when a force is exerted on the ends of the resilient damping devices, the central portion of these resilient damping devices is deformed elastically in traction. The resilient members of the devices in FIGS. 10 to 13 are accordingly mounted, by articulation, on the first and second masses, directly through their outer and inner ends.

Although in the foregoing Figures of the drawings, the resilient members of the resilient damping devices were of the metal type, in a modification (FIGS. 14 and 15), the resilient damping members 430 can of course comprise blocks 431 of resilient material.

Figure 14:
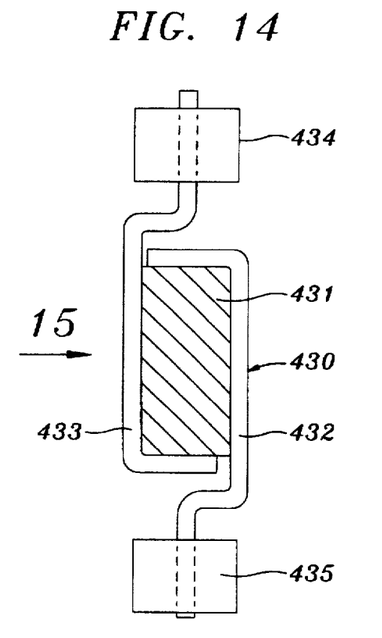
Figure 15:
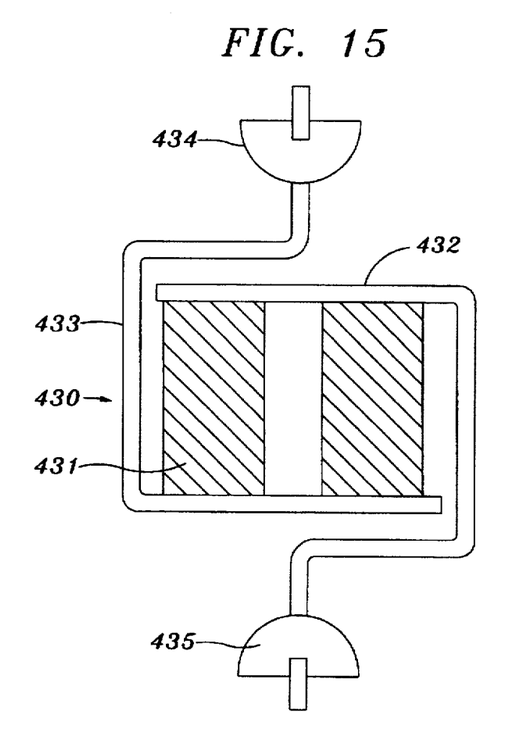
FIG. 15 is a view seen in the direction of the arrow 15 in FIG. 14.

Each block 431 works between two draw pieces 432, 433 having a generally U-shaped cross section, one of the branches of which is extended so as to carry a spherical articulating element 434, 435, for mounting by articulation in corresponding semi-cylindrical seatings, which are formed in the masses 1 and 2 or attached on the latter.

It will be noted that the block 431 is hollow in the centre.

The block 431 works between those branches of the draw pieces 433, 432 which are not extended radially, the draw pieces being mounted in head to toe relationship. The block 431 is adhesively secured on the appropriate branches of the said draw pieces 432, 433, for example by adhesive bonding or in situ vulcanisation.

Figure 16:
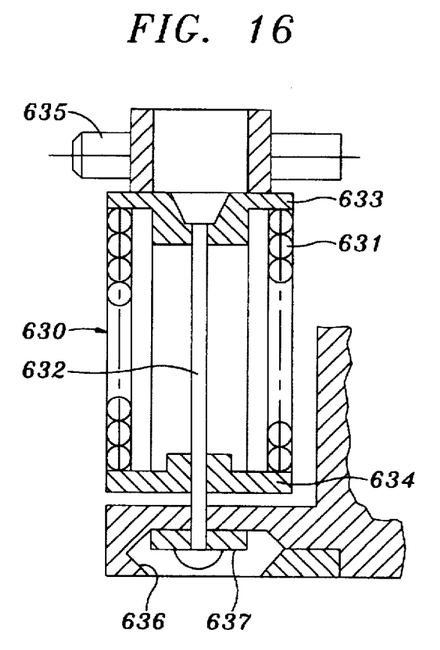
FIG. 16 is a view similar to FIG. 11 for yet another embodiment by way of example.

In FIG. 16, the resilient damping devices 630 comprise two supports 633, 634, between which a coil spring 631 works radially.

The support 633 carries a cable which is fixed by means of a ring 637 within a recess 636 in one of the masses, in this example the mass 2. The support 633 is able to slide along a cable 632. In its upper part, the support 634 carries a pivot pin 635 which is in two parts, for mounting on one of the masses by articulation. The cable extends through the lower part of the support. Thus, one of the articulations is provided by the cable 632 and the other by the pivot pin 635, with the support 633 being able to slide with respect to the support 634, being guided by the said support.

Figure 17:
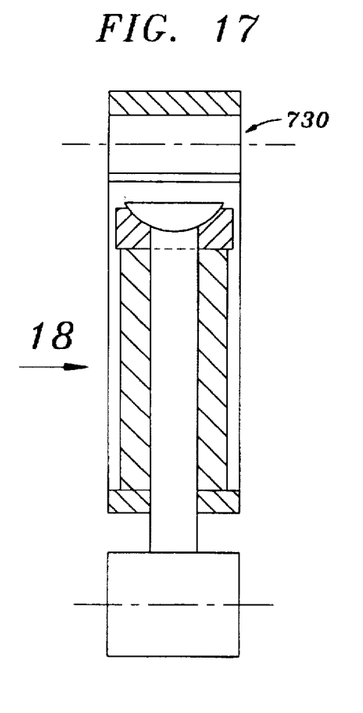
FIGS. 17 and 18 are views similar to FIGS. 10 and 11, for still further embodiments by way of example.
Figure 18:
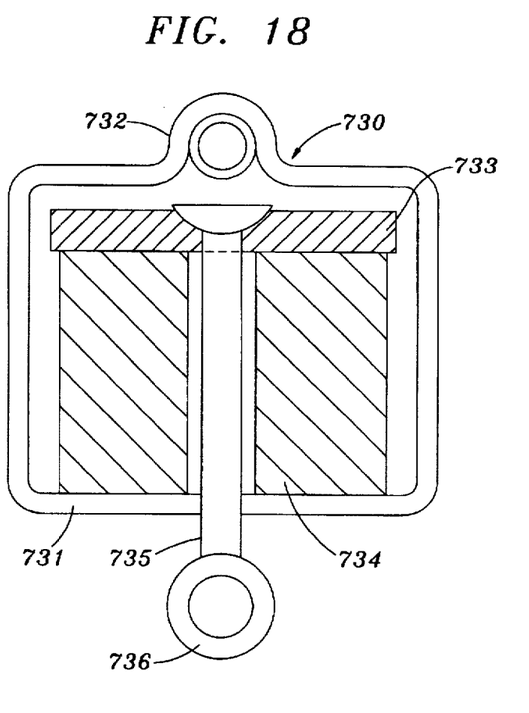

In FIGS. 17 and 18, the resilient damping device 730 comprises a support 731 of rectangular form, with an upper end 732 in the form of a loop for fitting of a pivot pin which has a central bore.

A rod 735, carrying a pivot pin 736 having a central bore, passes, with a clearance, through that side of the support 731 which is opposite to the side that includes the loop 732. The said rod passes, with a clearance, through the block 734 of resilient material, and is fixed to a support 733.

The block 734 is secured adhesively to the support 733 and to the appropriate side of the support 731.

It will be seen that the invention opens the way to many different applications, and that in FIGS. 14 to 18, the resilient members work in compression in such a way that in a modification there is no need to fasten the blocks of resilient material, which are for example of elastomeric material or rubber. For this purpose it is sufficient to fit the blocks under precompression.

In a modification, FIG. 1, the central spring 32 may be omitted due to the symmetry of the two springs 31, 32 acting purely radially between the two masses in the rest position.

In FIG. 16, the spring 631 may be replaced by a block of resilient material which is hollow in the centre.

The same is true in FIGS. 14, 15 and 17, 18, in which the blocks 431, 731 may be replaced by coil springs. In that case, it is necessary to provide the draw pieces with shoulders for the purpose of centring the springs.

In a modification, the first mass 1 may include a plate 11 in the form of a radial disc carrying at its outer periphery an axially oriented crown on which a closure ring 15, which can optionally be of divided form, is fixed. The crown and the closure ring are then together assembled to the plate 11 by means of rivets which pass axially for this purpose through the closure ring, the crown and the plate 11.

The mass 1 then has at its outer periphery an annular cavity which enables the resilient damping device 3 in accordance with the invention to be accommodated, with an annular support element being defined for fitting the first articulating means (for example the pivot pins 7), and for increasing its inertia.

In every case, the said first articulating means 7 are then well supported, because they extend axially between the plate 11 and the closure ring 15, which may be divided into annular sectors, being engaged in the closure ring 15 and the plate 11. The first articulating means are then not cantilevered, and they are accordingly well supported. The said first means are then in no danger of tilting.

In addition, the inertia of the first mass 1 is increased because the support element and the first articulating means 7 are located at the outer periphery of the first mass.

Moreover, this gives rise to an increase in the length of the resilient member of the resilient damping device in accordance with the invention. In that way, the angular displacement between the two masses 1, 2 is increased, leading to improved absorption of the vibrations.

In a modification, the second articulating means 6 may be located on a pitch circle having a diameter slightly greater than that of the pitch circle in the plate 11 on which the fastening members (the studs 101) are located, such that, in every case, the second articulating means 6, 600 are located on generally the same pitch circle as the access holes 104 in the plate 11 which are provided for accommodating the studs 101. This also leads to an increase in the length of the resilient members of the resilient damping device in accordance with the invention. For this purpose, the bearing means 14 are fitted either radially inwardly of the access holes 27 (FIG. 1), being of small size and therefore inexpensive, or at the outer periphery of the masses 1, 2 (FIG. 8).

Although in the drawings, the first and second articulating means are aligned radially in the rest position of the damped flywheel, the line of action being radial, in a modification these articulating means may be unaligned radially in the rest position, with one of the articulating means then being slightly offset circumferentially in the rest position of the damper with respect to the radius that passes through the other articulating means.

The bearing means 14 may of course consist of a coating, for example a coating based on amorphous diamond carbon and formed, for example, on the sleeve 13 in FIG. 1, which may be attached on the plate 11, for example by riveting.

The number of resilient members provided will depend on the application, as will their circumferential spacing. In FIGS. 1 to 7, there are four sets. It is of course possible to provide three sets, spaced apart circumferentially at regular intervals.

The closure ring 15 may be extended inwardly, and may be provided with windows through which the resilient members extend.

Finally, the tools associated with the screwed fastening members 101 are of a form which is adapted for the heads of the latter. These heads may be of the cruciform recess type or of the hexagon type. All this depends on the applications.

We claim:

1. A damped flywheel, comprising a first and a second coaxial mass (1, 2) which are mounted for movement of one with respect to the other against the action of a resilient damping device (3, 130, 230 . . . ) comprising at least one resilient member (31 to 33; 133; 231, 232 . . . ), in which the resilient member (31 to 33; 133; 231, 232 . . . ) acts generally radially between the masses in the rest position of the flywheel, in such a way that the resilient member occupies a generally radial rest position and inclined working positions, and in which the second mass (2) is mounted for rotation on the first mass (1) by interposed bearing means (14, 114) which are arranged at one of the inner and outer peripheries of the first mass (1), wherein the resilient member (31, 32, 33, 431) is mounted for articulation on the two masses (1, 2) by means of interposed draw pieces (4, 5, 432, 433).

2. A damped flywheel according to claim 1, wherein the draw pieces (4, 5, 432, 433) are mounted in head to toe relationship.

3. A damped flywheel according to claim 2, wherein the draw pieces (4, 5) are of matching forms one to the other, in which each one has a base portion (44, 54) and an odd number of teeth (41, 42, 43; 51, 52, 53) which are joined to the said base portion.

4. A damped flywheel according to claim 3, wherein the draw pieces (4, 5) have three teeth (41, 42, 43; 51, 52, 53).

5. A damped flywheel according to claim 4, wherein one of the teeth (43 to 53) is flanked symmetrically by the other two teeth (42, 41; 52, 51), and has a free end formed with a hole (46, 56) for mounting of a pivot pin (6, 7) therein.

6. A damped flywheel according to claim 3, wherein the teeth of the draw pieces (4, 5) are in contact with each other, with a layer (8) having a low coefficient of friction interposed between them.

7. A damped flywheel according to claim 6, wherein the said teeth of the draw pieces (4, 5) are mounted within guide tubes (34 to 36).

8. A damped flywheel according to claim 7, wherein the said guide tubes (34 to 36) are of a synthetic material having a low coefficient of friction, each one having two diametrically opposed ribs (40, 50).

9. A damped flywheel according to claim 8, wherein the resilient damping devices comprises coil springs (31, 32, 33) which are fitted over said guide tubes (34 to 36).

10. A damped flywheel according to claim 1, wherein, one of the draw pieces (45; 432, 433) is mounted for articulation on the outer periphery of the first mass (1), while the other draw member is mounted for articulation on the inner periphery of the second mass.

11. A damped flywheel according to claim 1, wherein, one of the draw pieces is mounted for articulation on the outer periphery of the second mass (2), while the other draw member is mounted for articulation on the inner periphery of the first mass (1).

12. A damped flywheel comprising: a first and second coaxial mass (1, 2) which are mounted for movement of one with respect to the other against the action of a resilient damping device (3, 130, 230 . . . ) comprising at least one resilient member (31 to 33; 133; 231, 232 . . . ), mounted for articulation on each of said masses, and acting generally radially between said masses in the rest position of the flywheel, in such a way that said resilient member occupies a generally radial rest position and inclined working positions, wherein the first mass (1) comprises a plate (11) and the resilient member (31 to 33; 133; 231, 232 . . . ) is mounted for articulation on the outer periphery of the first mass (I) and for articulation on the inner periphery of the second mass (2), wherein, the plate (11) has a window (16), for fitting of said resilient member therein and for ventilation of the resilient member.

13. A damped flywheel comprising: a first and second coaxial mass (1, 2) which are mounted for movement of one with respect to the other against the action of a resilient damping device (3, 130, 230 . . . ) comprising at least one resilient member (31 to 33; 133; 231, 232 . . . ), wherein the resilient member (31 to 33; 133; 231, 232 . . . ) is mounted for articulation on each of said masses by means of interposed pivot pins (6, 7; 60, 70; 600), said resilient member acting generally radially between said masses in the rest position of the flywheel, in such a way that said resilient member occupies a generally radial rest position and inclined working positions, and said mass (2) is mounted for rotation on the first mass (1) by interposed bearing means (14, 114) which are arranged at one of the inner and outer peripheries of the first mass (1) wherein, the pivot pin (6) is mounted between two consecutive holes (27) of the second mass (2) which are arranged for the passage therethrough of a tool for screw fastening of the first mass (1) to its associated driving shaft.

14. A damped flywheel comprising: a first and a second coaxial mass (1, 2) which are mounted for movement of one with respect to the other against the action of a resilient damping device (3, 130, 230 . . . ) comprising at least one resilient member (31 to 33; 133; 231, 232 . . . ), mounted for articulation on each of said masses, wherein said resilient member acts generally radially between said masses in the rest position of the flywheel, in such a way that said resilient member occupies a generally radial rest position and inclined working positions, and second mass (2) is mounted for rotation on the first mass (1) by interposed bearing means (14, 114) which are arranged at one of the inner and outer peripheries of the first mass (1), wherein the first mass (1) is adapted to be fixed to a driving shaft, while the second mass (2) constitutes the reaction plate of a friction clutch, wherein, said resilient member is mounted on the inner periphery of one of the two masses (1, 2) for articulation provided by said articulating means (6, 60, 600) which are arranged generally on a common pitch circle with the holes (104) which are formed in the first mass at an inner periphery thereof, for passage therethrough of a fastening member (101) fastening the first mass (1) to a driving shaft.

15. A damped flywheel according to claim 14, characterised in that the second mass (2) is mounted for rotation on the first mass (1) by bearing means (14) of reduced size, which are interposed operatively between the inner periphery of the second mass (2) and the outer periphery of a central sleeve (13) of the first mass (1) at its inner periphery, and in that the said bearing means (14) are disposed radially inwardly of a through hole (27), which is comprised in the second mass (2) for passage therethrough of tools for the fixing of fastening members by which it is secured on the driving shaft associated with the first mass.

16. A damped flywheel comprising: a first and a second coaxial mass (1, 2) which are mounted for movement of one with respect to the other against the action of a resilient damping device (3, 130, 230 . . . ) comprising at least one resilient member (31 to 33; 133; 231, 232 . . . ), mounted for articulation on each of said masses, and acting generally radially between said masses in the rest position of the flywheel, in such a way that said resilient member occupies a generally radial rest position and inclined working positions, and second mass (2) is mounted for rotation on the first mass (1) by interposed bearing means (14, 114) which are arranged at one of the inner and outer peripheries of the first mass (1), wherein one of the masses (1, 2) has at an outer periphery thereof a support element, which may be of divided form, for carrying an articulation means (7) for mounting of said elastic member by articulation.

17. A damped flywheel according to claim 16, characterised in that the support element is formed at the outer periphery of the first mass (1), the second mass (2) being mounted for rotation at an inner periphery thereof on bearing means (14) of reduced size carried by a central sleeve (13) fixed to the first mass (1).

18. A damped flywheel according to claim 17, characterised in that the said support element is defined by recesses (17) formed in a plate (11) of the first mass (I).

19. A damped flywheel according to claim 18, characterised in that a window (16) is formed in the said recess (17) for mounting of the said resilient member therein.

20. A damped flywheel according to claim 18 characterised in that the support element is bounded by a closure member (15), and which is fixed on the plate (11) of the first mass (1) at the outer periphery of the latter.

* * * * *